(12) United States Patent
Allmon (10) Patent No.: US 10,054,143 B2
(45) Date of Patent: Aug. 21, 2018

(54) CONNECTOR DEVICE FOR USE IN CONNECTING ELEMENTS OF BRACING SYSTEMS AND THE LIKE

(71) Applicant: James A. Allmon, Danville, CA (US)

(72) Inventor: James A. Allmon, Danville, CA (US)

( * ) Notice: Subject to any disclaimer, the term of this patent is extended or adjusted under 35 U.S.C. 154(b) by 468 days.

(21) Appl. No.: 14/997,978

(22) Filed: Jan. 18, 2016

(65) Prior Publication Data

US 2016/0208838 A1     Jul. 21, 2016

Related U.S. Application Data (60) Provisional application No. 62/105,155, filed on Jan. 19, 2015.

(51) Int. Cl.
| | |
|---|---|
| *F16B 7/18* | (2006.01) |
| *F16B 2/06* | (2006.01) |
| *F16L 3/133* | (2006.01) |
| *F16B 9/02* | (2006.01) |

(52) U.S. Cl.
CPC .............. *F16B 7/185* (2013.01); *F16B 2/065* (2013.01); *F16B 9/026* (2013.01); *F16L 3/133* (2013.01)

(58) Field of Classification Search
CPC ...... B21D 28/00; B21D 28/002; B21D 28/28; F16B 2/065; F16B 5/0291; F16B 7/185; E04B 1/40; E04B 1/98; B25B 5/10; B25B 5/101
See application file for complete search history.

(56) References Cited

U.S. PATENT DOCUMENTS

| | | | | |
|---|---|---|---|---|
| 1,840,216 A | * | 1/1932 | Tormo | ...................... F16L 3/24 248/229.15 |
| 3,008,234 A | * | 11/1961 | Mattera | ................ B21D 28/002 30/180 |
| 4,570,885 A | | 2/1986 | Heath | |
| 5,666,840 A | * | 9/1997 | Shah | ...................... B21D 28/28 72/336 |
| 6,273,372 B1 | | 8/2001 | Heath | |
| 6,517,030 B2 | | 2/2003 | Heath | |
| 6,708,930 B2 | | 3/2004 | Heath | |

(Continued)

*Primary Examiner* — Jonathan P Masinick
(74) *Attorney, Agent, or Firm* — Claude A. S. Hamrick; Hamrick IP—Law Office (57) ABSTRACT

A connector including a connector body having first means provided for attachment to a first object, and second means for connectively engaging a second object, the second means including a slot provided in one side of the body for receiving a thin walled portion of the second object; a threaded first bore provided on one side of the slot and axially aligned with a second bore provided on the opposite side of the slot and axially aligned with the first bore to form a die-hole, and an elongated and threaded punch-bolt having a tool receiving head formed at one extremity thereof and an elongated punching tip formed at the opposite extremity thereof, the punch-bolt having threads formed along at least a portion of its length for threadably engaging the threads of the first bore, the punch-bolt being rotatable to advance axially along the first bore such that the punching tip engages and punches through a portion of the second object and extends into the die-hole thereby removably securing the connector body to the second object.

14 Claims, 4 Drawing Sheets

(56) References Cited

U.S. PATENT DOCUMENTS

| | | | |
|---|---|---|---|
| 6,931,901 B2 * | 8/2005 | Ghiran | B21D 28/28 |
| | | | 29/421.1 |
| 6,971,623 B2 | 12/2005 | Allmon et al. | |
| 7,097,141 B2 | 8/2006 | Heath | |
| 7,441,730 B2 | 10/2008 | Heath | |
| 7,462,402 B2 * | 12/2008 | Coelho | B21D 28/28 |
| | | | 428/597 |
| 7,654,043 B2 | 2/2010 | Heath | |
| 7,669,806 B2 | 2/2010 | Heath | |
| 8,001,819 B2 * | 8/2011 | Mizumura | B21D 26/035 |
| | | | 29/421.1 |
| 9,067,252 B2 * | 6/2015 | Christianson | B26F 1/14 |

* cited by examiner

CONNECTOR DEVICE FOR USE IN CONNECTING ELEMENTS OF BRACING SYSTEMS AND THE LIKE

FIELD OF INVENTION

The present invention relates generally to building construction connector components, and in particular, to an improved connector device particularly suited for use, inter alia, in the connection of bracing system components to building structures, especially those associated with electrical, mechanical, and plumbing systems used to resist earthquake related inertial loads.

BACKGROUND

There are various seismic bracing systems associated with electrical, mechanical, and plumbing systems currently being used in building construction that include elongated struts and end fasteners which rely on either friction type, or deformation type connection devices which provide for the interconnection of the bracing struts to other elements of the bracing system.

A typical friction type connection device will usually include one or more clamps that are attached to a pipe strut. Such installations do not provide for a positive mechanical interlock between the connection device and the strut, and are subject to problems if the installation procedures are not followed and the required clamping forces are not achieved.

A deformation type of connection device will generally include a bolt that has a specifically configured tip that is designed to create a deformation in the strut element so as to provide a partial mechanical interlock between the connection device and a strut element. For these installations, the strut element may be a pipe, square or rectangular tube, angle, or channel framing. Generally, the bolts associated with deformation type connector devices must be tightened up to a minimum torque in order to achieve the minimum required material deformation in the strut element. In order to verify that this is accomplished, special inspections are required, which can be costly. To avoid the need for special inspections, bolts with twist-off heads that come off when the minimum required torque is applied to the bolt are sometimes used. The problem with twist-off bolts is that connector devices installed with such bolts can be very difficult to disassemble once the twist-off bolt heads have been severed.

An object of the present invention is to provide an improved connector which addresses the above mentioned deficiencies of friction type and deformation type connection devices.

Another object of the present invention is to provide an improved connection device that positively interlocks first and second objects together, yet is simple in construction, easy to install, and can be easily disconnected and reused.

Still another object of the present invention is to provide an improved connector that allows visual conformation of positive interlock between connected first and second objects.

Yet another object of the present invention is to provide an improved connector that provides visual conformation of and both positive frictional and mechanical interlock between first and second objects, yet is simple in construction, easy to install, and can be easily disconnected and reused.

SUMMARY OF THE INVENTION

Briefly, a presently preferred embodiment of the present invention provides a connector device for use in connecting a first object to a second object, and includes a connector body having one or more first means provided on one side thereof for enabling attachment of the connector body to the first object, and second means provided on a second side thereof for enabling connecting engagement with the second object, the second means being comprised of a slot or the like provided in the second side of the body and configured to form an upper and lower set of jaws for receiving a portion of the second object; a threaded first bore provided in one of the jaws and axially aligned with a second bore provided in the second jaw and forming a die-hole in the lower jaw; and an elongated punch-bolt having a tool receiving head formed at one extremity thereof, threads formed along at least a portion of the length thereof proximate the head for threadably engaging the threads of the first bore, and a blunt punching tip formed at the distal end thereof and adapted to operatively combine with the die-hole to form a combined frictional and mechanical connection mechanism.

More specifically, the present invention may be characterized as a punch-clamp connector or connection device that can be used in bracing systems to connect a strut or other bracing component to a wall, floor, roof or other part of a building structure. The device includes a body element that is preferably but not necessarily rectangular in shape; has one or more apertures or other means formed therein at or near one side of the body configured to allow the device to be attached by one or more fasteners to either another component of the bracing system, or to some other building element; a slot formed in another side of the body element to form a set of jaws; a threaded bore provided in one of the jaws and oriented at right angles to the plane of the slot; a die hole provided in the other jaw and axially aligned with the threaded bore in the first jaw; and a punch-bolt having a tool receiving head, a threaded body and a punching tip, the punch-bolt being initially disposed in the threaded bore provided in the first jaw of the body element, whereby when a wall section of a strut element or the like is inserted into the slot, the punch bolt can be rotatably advanced so as to engage the punching tip thereof with the inserted portion of the strut element.

It will be understood that with continued rotation of the punch-bolt, the pressure exerted by the punching tip on the wall of the strut element will punch a hole through the strut wall, push the punch-slug into the die hole in the second jaw, and with continued advancement of the punch-bolt, bring the threaded shoulder of the bolt (at the base of the punching tip) into contact with the surface of the strut element, thus clamping the punched portion of the strut element between the punch bolt shoulder and the second jaw and ensuring that the punching tip of the punch bolt has passed completely through the wall of the strut element and into the die hole to obtain both a frictional clamping engagement and a positive mechanical interlock between the strut element and the connector.

An important advantage of the present invention is that, unlike existing connection devices, the present invention uses a punching bolt to both in the material to which it will be secured, and use a part of the punch-bolt as a fastener for creating a positive mechanical inter-connection between the connector and the object (typically an object made of a punchable plastic, aluminum or steel material in the form of a sheet, strut, or pipe) to which it is to be attached.

Another advantage of the present invention is that using only the force required to thread the punch-bolt through its cooperating passageway in the connector body, the bolt is caused to punch a hole through the engaged strut material or the like and then remain in place therein while the punch-clamp is in service, thus providing a positive mechanical connection to the strut.

Still another advantage of the present invention is that a structural engineer can actually calculate the strength of the connection based upon the torque applied to the bolt and the actual shear strength of the punch tip and the engaged strut material.

These and other objects and advantages of the present invention will become apparent to those skilled in the art after having read the following detailed description of embodiments illustrated in the several figures of the drawing.

DETAILED DESCRIPTION OF EMBODIMENTS

Figure 1:
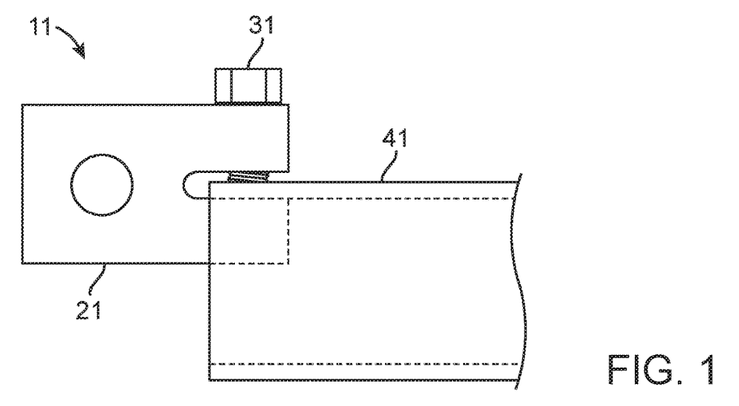
FIG. 1 is an elevational view of a punch-clamp connection device in accordance with the present invention and shown operatively engaging an end of a tubular strut.
Figure 6:
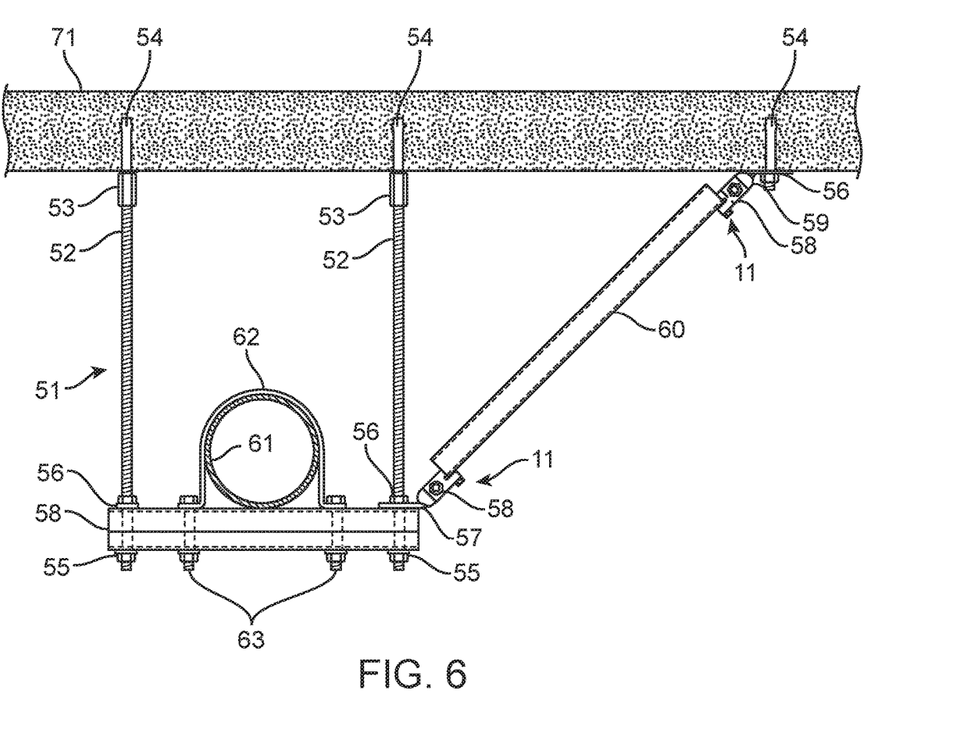
FIG. 6 is an elevational view showing use of embodiments of the present invention to connect the ends of a lateral bracing strut between a building structure and a suspended pipe support trapeze.

Referring now to FIG. 1 of the drawing, an embodiment of a punch-clamp connection device 11 is shown connected to an end of a thin walled tubular strut element 41 forming part of a bracing system (such as that illustrated in FIG. 6, for example). The punch-clamp connection device 11 is comprised of a body element 21 and a punch bolt 31, and is shown operatively attached to the strut element 41.

Figure 2:
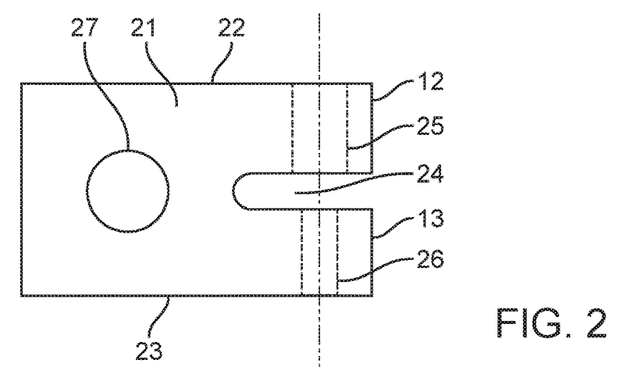
FIG. 2 is an elevational view of the body element of the device shown in FIG. 1 and showing in dashed lines the threaded-bore and the punch-bore.

FIG. 2 in a side elevational view showing details of the body element 21 per se, which is in one embodiment is generally rectangular in shape, with a top side 22, and a bottom side 23. A transverse slot 24 is provided at one end of body element 21 separating that end into two jaw-like members 12 and 13. Slot 24 will generally be orientated to extend into the end of the body parallel to the longitudinal axis of the body element, and may be advantageously located at or near it's mid depth as depicted.

A threaded bore illustrated by the dashed lines 25 is oriented at right angles to the plane of slot 24, is preferably centered on the thickness of body element 21, and extends through the upper jaw-like part 12 of the body 21 and preferably extends there through between the top side 22 and the lower side of jaw 12 defining the upper boundary of slot 24. A concentric die-hole or bore illustrated by the dashed lines 26, and also orientated at right angles to slot 24 and axially aligned with threaded aperture 25, extends through the bottom jaw-like part 13 of body 21 formed between the lower boundary of slot 24 and the bottom side 23 of body 21.

A transversely extending bore or aperture 27 is advantageously formed in a part of the body element 21 and is configured to allow the punch-clamp connection device 11 to be attached with a fastener (not shown) to either another element of the bracing system (not shown), or some other building element (not shown) as will be further described below. Depending on the particular application, examples of such fasteners might include bolts, U-bolts, hooks, snap hooks, cable ends, etc.

Figure 3:
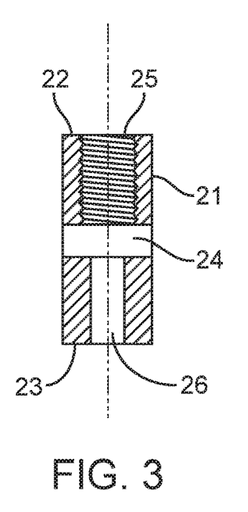
FIG. 3 is a transverse cross sectional view of the body element of FIG. 2 taken along the center-line of the bores.

FIG. 3 is a transverse cross sectional view taken across body element 21 at the axes of bores 25 and 26, and showing the top surface 22, bottom surface 23, slot 24, threaded bore 25, and die-hole (bore). 26. As indicated above, the threaded bore 25 is preferably centered on the thickness of body element 21, and the lower bore forming the die hole 26 is axially aligned therewith. Note that the diameter of bore 26 is preferably somewhat smaller than that of the threaded bore 25.

Figure 4:
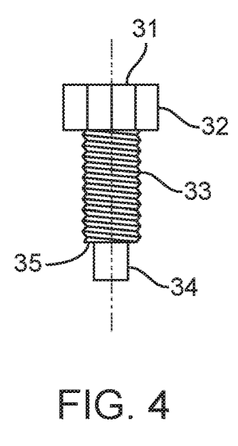
FIG. 4 is an elevational view of the punch-bolt partially shown in FIG. 1.

FIG. 4 is an elevation view of punch-bolt 31 and advantageously includes a hexagonally configured head 32 for engagement with a wrench, socket or other bolt driving tool (not shown). Alternatively, or in addition, a multi-faceted socket may be formed in the upper end of punch-bolt 31 for driveably receiving an "Allen" or other suitably configured bolt driver. Suitable threads 33 matching the threads of bore 25 are formed along a substantial portion of the length of bolt 31.

Figure 5:
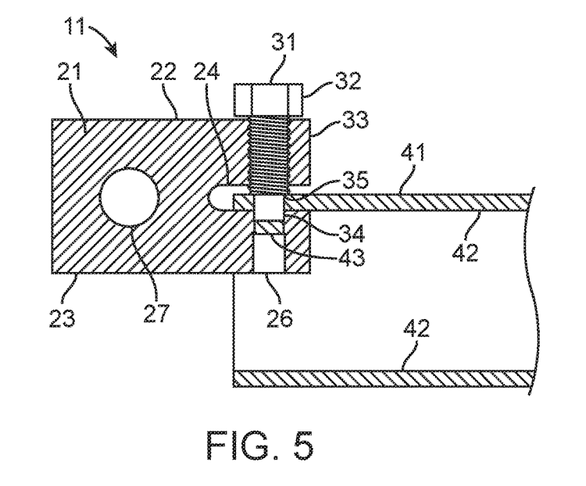
FIG. 5 is a longitudinal cross sectional view further illustrating details of the punch-clamp connection device attached to a strut element of a bracing system as shown in FIG. 1.

The distal end portion of bolt 31 is of a reduced diameter to match the diameter of die hole 26 and terminates in a sharp edged punching tip 34 that may be configured to have any suitable punching configuration. It will be appreciated that, as is further illustrated in FIG. 5, a benefit of making the outer diameter of the punching tip 34 materially smaller than the diameter of the threaded portion of the bolt is that the shoulder 35 formed at the junction provides a clamping element for clamping an engaged member 41 between it and the upper surface of the lower jaw as depicted in FIG. 5. A suitable clamping force determined by the torque applied to bolt 31, as per a calculated design specification, insures that the attachment is both frictional and mechanical.

FIG. 5 is a longitudinal cross sectional view showing the punch-clamp connection device 11 attached to a thin walled rectangular or tubular strut element 41 forming part of a bracing system (not shown). As can be seen in this figure, a portion of the wall 42) of strut element 41 has been inserted into slot 24 of body element 21, and punch bolt 31 has been threaded into aperture 25 in body element 21, and has fully engaged the wall 42 of strut element 41, and the punching tip 34 of punch-bolt 31 has been driven through the strut wall punching out a slug 43 by the application of a specified torque to the bolt. As illustrated, the slug 43 created by punching tip 34 has been pushed into die hole 26.

Also note that punch bolt 31 has been advanced to its limit such that the punch has passed through the engaged strut wall and into the bore 26, and the shoulder 35 of punch-bolt 31 has clampingly engaged the wall 42 of strut element 41, and forcibly clamped the strut element to the lower jaw of the connection device 11, thus ensuring that the shoulder 35 and punch tip 34 have achieved both frictional and mechanical attachment of the strut to the body element.

FIG. 6 is an elevational view depicting a pipe support trapeze 51 with vertical support rods 52 attached to a structural concrete building element 71 with concrete anchors 54 and couplers 53. Rods 52 are attached to horizontal support element 56 with nuts and bearing plates 55. Pipe 61 is secured to horizontal support element 56 with bracket 62, and bolts, nuts, and bearing plated 63. Pipe support trapeze 51 is laterally braced by a strut element 60. Strut element 60 is attached to support trapeze 51 with a punch clamp 11 secured to strut element 60, and attached to lower bracket 57 with a fastener 58. Lower bracket 57 is secured to horizontal support element 56 and vertical rod 52 with a nut 56. The other end of strut element 60 is attached to structural concrete building element 71, with a punch clamp 11 secured to strut element 60, and attached to upper bracket 59 with a fastener 58. Upper bracket 59 is secured to structural concrete building element 71 with a concrete anchor 54 and nut 56.

Figure 7:
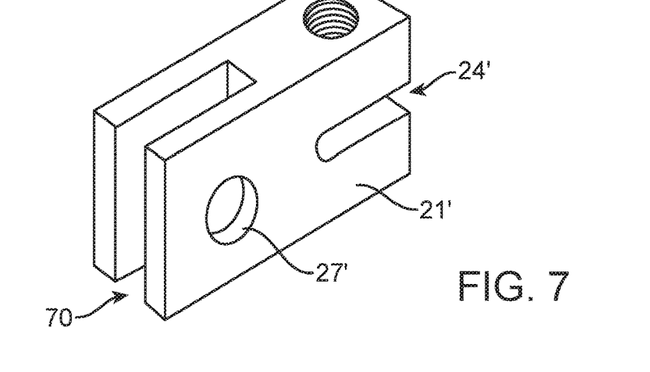
FIG. 7 illustrates a first alternative embodiment of the present invention.

In an alternative embodiment 21' depicted in FIG. 7, a slot 70 similar to slot 24', and perhaps oriented orthogonal to slot 24', is provided for receiving an edge of an apertured plate, flange or bar (not shown) to which the body element is to be secured by a bolt or pin (not shown) extended through the aperture 27' and that of the plate, flange or bar.

Figure 8:
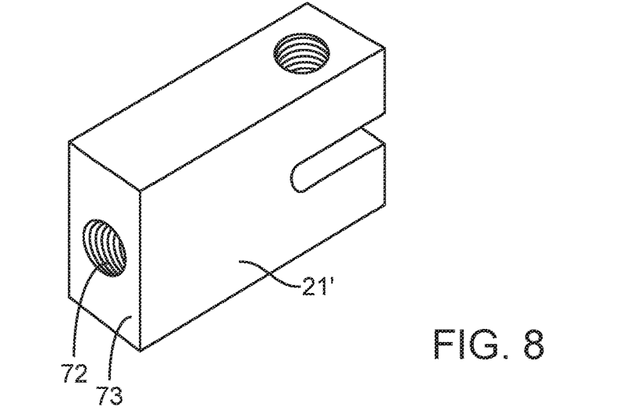
FIG. 8 illustrates a second alternative embodiment of the present invention.

In another alternative embodiment 21", depicted in FIG. 8 of the drawing, a threaded bore 72 provided in the end wall 73 opposite the jaws including end for receiving a threaded end of a rod, shaft, pipe or the like.

Figure 9:
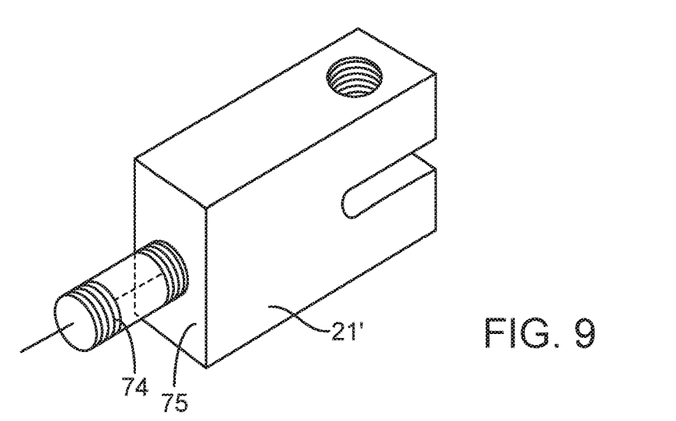
FIG. 9 illustrates a third alternative embodiment of the present invention.

In yet another alternative embodiment 21''' illustrated in FIG. 9, a threaded stud 74 might be provided to extend away from the end 75 for engagement with a correspondingly threaded aperture formed in a wall, beam, flange or the like to which the body element is to be secured.

It is thus to be understood the present invention may be embodied in other specific forms without departing from its basic functions, features, or essential characteristics. The described embodiments are to be considered in all respect only as illustrative, and not restrictive. For example, in place of or in addition to the fastening bore 27, a threaded stud bolt might be welded or otherwise secured to the body as illustrated in FIG. 9 to allow it to be conveniently secured to a structural member with an appropriate nut or the like.

In another alternate embodiment, similar to that illustrated in FIG. 7, a second oppositely facing slot and punch-bolt assembly might be used to allow the connector device to be advantageously used to join two punchable metal sheets or straps or tubes together.

Figure 10:
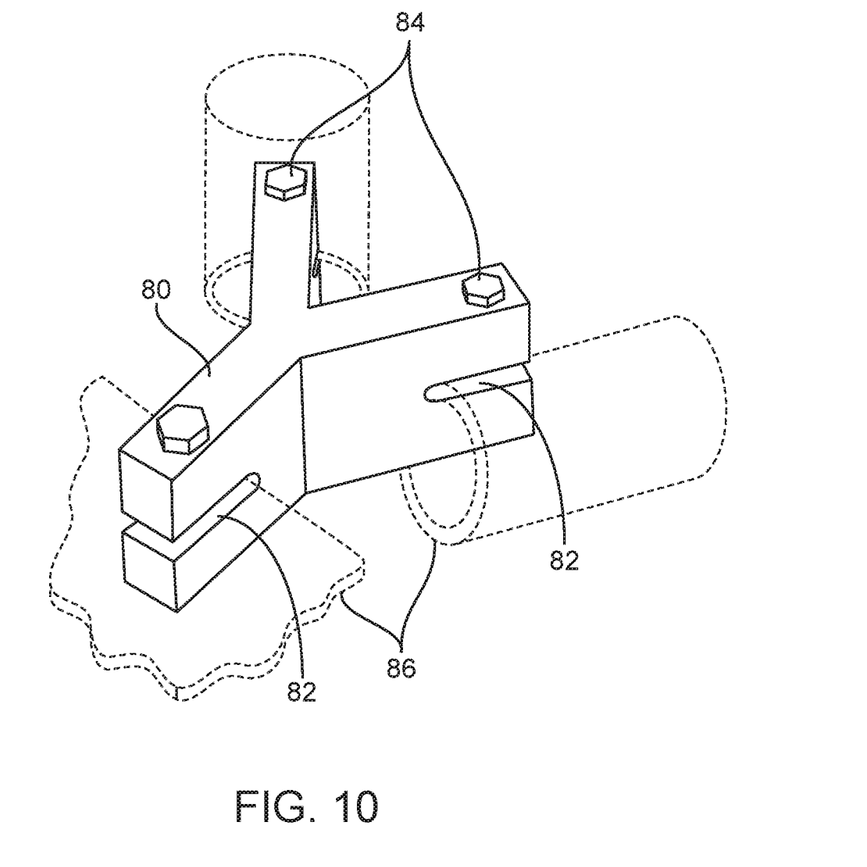
FIG. 10 is a perspective view illustrating a multiple punch-clamp embodiment of the present invention.

In accordance with another embodiment of the present invention illustrated in FIG. 10, a plurality of clamp connector elements may be ganged together in an appropriate multi-legged, spider configuration to permit a plurality of differently directed struts, or the like, to be connected together at a single junction point. In this illustrative embodiment, each leg of a three-legged connector body 80 is provided with a slot 82, threaded bore (not shown), punch-bore (not shown) and punch-bolt 84. It will be understood that where appropriate, the connector body 80 can be configured to include any desired number of legs extending in any direction. and any of the other fastening configurations described above could alternatively be used or incorporated into any leg.

Accordingly, it is intended that the scope of this invention be interpreted as broadly as the appended claims will allow, rather than being limited by the foregoing description of presently described embodiments. All alterations and/or changes which come within the meaning and range of equivalency of the claims are to be embraced within their scope.

The invention claimed is:

1. A connection device for use in connecting a first object to a second object, the device comprising:
    a connector body having first means for attachment of the first object, and
    second means for connective engagement with the second object, the second means including a first jaw and a second jaw separated by a slot formed in the connector body for receiving a portion of the second object, a threaded first bore provided in the first jaw, and a second bore provided in the second jaw, the second bore being axially aligned with the first bore and forming a die-hole in the second jaw; and
    an elongated punch-bolt disposed within the first bore and including a tool receiving head formed at one extremity of the punch-bolt, and an elongated punching tip formed at the opposite extremity of the punch-bolt, the punch-bolt having threads formed along at least a portion of its length for threadably engaging the threads of the first bore, the punch-bolt being rotatable about its longitudinal axis and caused thereby to advance axially along the first bore such that the elongated punching tip initially engages and then punches through the portion of the second object disposed within the slot and then extends into the die-hole thereby mechanically securing the connector body to the second object.

2. A connection device as recited in claim 1, wherein the cross-sectional diameter of the threaded first bore is larger than the cross-sectional diameter of the second bore;
    wherein the cross-sectional diameter of the threaded portion of the punch-bolt operatively corresponds to the cross-sectional diameter of the threaded portion of the first bore,
    wherein the cross sectional diameter of the elongated punching tip operatively corresponds to the cross-sectional diameter of the second bore to provide a punch and die relationship; and
    wherein the difference in diameters at the junction of the threaded portion and the elongated punching tip portion of the punch-bolt forms a shoulder for engaging the initially engaged surface of the second object as the punching tip passes there through, and thus drives the opposite surface thereof into frictional engagement with the second jaw.

3. A connection device as recited in claim 1 wherein the first means provided for attachment to the first object includes another aperture formed in the connector body and spaced apart from the position of the first mentioned slot.

4. A connection device as recited in claim 3 wherein the first means provided for attachment to the first object further includes
    another slot formed in the connector body on a side thereof spaced apart from the first recited slot, and
    wherein the another aperture is embodied as another bore positioned to pass through the body and the another slot such that when an appropriately apertured part of the first object is received within the second slot, the connector body can be secured to the first body by a bolt, pin or similar fastener inserted through the another bore and an aligned aperture of the first object.

5. A connection device as recited in claim 3 wherein the first means for attachment of the first object includes a third jaw and a fourth jaw separated by another slot formed in the connector body for receiving a portion of the first object, a threaded third bore provided in the third jaw, and a fourth bore provided in the fourth jaw, the fourth bore being axially aligned with the third bore and forming another die-hole in the fourth jaw; and a second elongated punch-bolt disposed within the third bore and including a tool receiving head formed at one extremity of the second punch-bolt, and a second punching tip formed at the opposite extremity of the second punch-bolt, the second punch-bolt having threads formed along at least a portion of its length for threadably engaging the threads of the third bore, the second punch-bolt being rotatable about its longitudinal axis and caused thereby to advance axially along the third bore such that the second punching tip initially engages and then punches through the portion of the first object disposed within the another slot and extends into the another die-hole thereby mechanically securing the connector body to the first object.

6. A connection device as recited in claim 5,
   wherein the cross-sectional diameter of the threaded second bore is larger than the cross-sectional diameter of the fourth bore;
   wherein the cross-sectional diameter of the portion of the second punch-bolt operatively corresponds to the cross-sectional diameter of the fourth bore to provide a punch and die relationship; and
   wherein the difference in diameters forms a second shoulder for clampingly engaging and thus frictionally engaging the portion of the first object in contact with the fourth jaw.

7. A connector for use in connecting a first object to a second object, the connector comprising:
   a connector body having one or more first means provided on one part thereof for attachment to at least a first object, and second means provided in a second part of the connector body for connective engagement with a portion of a second object, the second means including a first slot provided in the second part of the body and configured to form a first jaw on one side of the slot and a second jaw on an opposite side of the slot, the slot being adapted for receiving a punchable portion of the second object, and a threaded first bore formed in a first one of the jaws and axially aligned with a second bore formed in the second jaw, the second bore forming a punch receiving die; and
   an elongated punch-bolt having a tool receiving head formed at one extremity thereof, threads formed along at least a portion of the length thereof proximate the head for threadably engaging the threads of the first bore, and an elongated punching tip formed at the distal end thereof, the punch-bolt being adapted to operatively combine with the die to form a punch-and-die for punching a hole in the punchable portion of the second object when such object is disposed within the first slot and between the first and second jaws, the punch-bolt being rotatable about its longitudinal axis and operable to advance axially through the first bore such that the punching tip engages and then punches through the second object until the punching tip extends into the die thereby removably connecting the connector body to the second object.

8. A connector as recited in claim 7, wherein the cross-sectional diameter of the threaded first bore is larger than the cross-sectional diameter of the second bore;
   wherein the cross-sectional diameter of the threaded portion of the punch-bolt operatively corresponds to the cross-sectional diameter of the threaded portion of the first bore,
   wherein the cross sectional diameter of the elongated punching tip operatively corresponds to the cross-sectional diameter of the second bore to provide a punch and die relationship; and
   wherein the difference in diameters at the junction of the threaded portion and the elongated punching tip portion of the punch-bolt forms a shoulder for engaging the initially engaged surface of the second object as the punching tip passes there through, and thus drives the opposite surface thereof into frictional engagement with the second jaw.

9. A connector as recited in claim 7 wherein the first means provided for attachment to the first object includes another aperture formed in the connector body and spaced apart from the position of the first mentioned slot.

10. A connector as recited in claim 9 wherein the first means provided for attachment to the first object further includes
    another slot formed in the connector body on a side thereof spaced apart from the first recited slot, and
    wherein the another aperture is embodied as another bore positioned to pass through the body and the another slot such that when an appropriately apertured part of the first object is received within the second slot, the connector body can be secured to the first body by a bolt, pin or similar fastener inserted through the another bore and an aligned aperture of the first object.

11. A connector as recited in claim 9 wherein the first means for attachment of the first object includes a third jaw and a fourth jaw separated by another slot formed in the connector body for receiving a portion of the first object, a threaded third bore provided in the third jaw, and a fourth bore provided in the fourth jaw, the fourth bore being axially aligned with the third bore and forming another die-hole in the fourth jaw; and a second elongated punch-bolt disposed within the third bore and including a tool receiving head formed at one extremity of the second punch-bolt, and a second punching tip formed at the opposite extremity of the second punch-bolt, the second punch-bolt having threads formed along at least a portion of its length for threadably engaging the threads of the third bore, the second punch-bolt being rotatable about its longitudinal axis and caused thereby to advance axially along the third bore such that the second punching tip initially engages and then punches through the portion of the first object disposed within the another slot and extends into the another die-hole thereby mechanically securing the connector body to the first object.

12. A connector as recited in claim 11,
    wherein the cross-sectional diameter of the threaded second bore is larger than the cross-sectional diameter of the fourth bore;
    wherein the cross-sectional diameter of the portion of the second punch-bolt operatively corresponds to the cross-sectional diameter of the fourth bore to provide a punch and die relationship, the difference in diameters forming a shoulder for engaging and clamping the portion of the first object in contact with the fourth jaw to additionally establish a frictional connection of the connector body to the first object.

13. A multi-legged connector for use in connecting at least a first object to one or more second objects, the connector comprising:
    a connector body having
      first means provided in at least one part thereof for attachment to a corresponding first object; and
      second means provided in one or more second parts of the connector body for connective engagement with corresponding second objects,
      each second part including
        a slot adapted to receive a punchable portion of a corresponding second object, a first jaw formed on one side of the slot, and
a second jaw formed on an opposite side of the slot,
a threaded first bore formed in the first jaw, and
a second bore formed in the second jaw, the second bore forming a punch receiving die; and
an elongated punch-bolt having a tool receiving head formed at one extremity thereof, threads formed along at least a portion of the length thereof proximate the head for threadably engaging the threads of the first bore, and an elongated punching tip formed at the distal end thereof, the punch-bolt being adapted to operatively combine with the die to form a punch-and-die for punching a hole in the punchable portion of a second object disposed within the slot and between the first and second jaws, the punch-bolt being rotatable about its longitudinal axis and operable to advance through the first bore such that the punching tip engages and then punches through the second object until the punching tip extends into the die thereby removably establishing mechanical connection of the connector body to the second object.

14. A multi-legged connector as recited in claim 13, wherein the cross-sectional diameter of the threaded first bore is larger than the cross-sectional diameter of the second bore, the difference in diameters forming a shoulder for engaging and clamping the portion of the first object in contact with the second jaw to additionally establish a frictional connection of the connector body to the second object.

\* \* \* \* \*